United States Patent Office 3,037,957  
Patented June 5, 1962

3,037,957  
COMPOSITION COMPRISING PORTLAND CEMENT AND A PARTIAL CALCIUM SALT OF A VINYL ACETATE-MALEIC ANHYDRIDE COPOLYMER  
Graham Montague Bruere, Eltham, Victoria, Australia, assignor to Commonwealth Scientific and Industrial Research Organization, East Melbourne, Victoria, Australia, a body corporate  
No Drawing. Filed Aug. 26, 1957, Ser. No. 680,412  
Claims priority, application Australia Aug. 27, 1956  
3 Claims. (Cl. 260—41)

This invention relates to improvements in concrete, mortar or the like.

Many fresh concrete mixes exhibit such undesirable properties as excessive bleeding, aggregate segregation, lack of workability, and low degree of cohesiveness. This is particularly true of lean mixes and mixes made from improperly graded aggregate. These faults can often be corrected by increasing the proportion of fine sand in the mix or by increasing the cement content of the mix. However in large scale concrete work the cartage of large amounts of fine sand for considerable distances, if suitably graded sand is not available near the construction site, or the cost and cartage of extra cement, adds materially to the cost of construction.

The main object of this invention is to provide a cheap alternative means of decreasing bleeding and aggregate segregation, improving cohesiveness, and increasing the resistance to overvibration of concrete mixes.

Other objects of this invention are:

(a) To allow the workability of lean concretes and mortars to be improved by increasing the water/cement ratio.
(b) To reduce aggregate segregation and bleeding in fresh concrete transported in jolting vehicles and also to improve the ease of dumping wet concrete mixes from buckets, barrows and trucks especially after long periods of time.
(c) To improve the pumping characteristics of concrete.
(d) To reduce the washing away by water currents of the surfaces of freshly placed underwater concrete.
(e) To reduce the amount of surface cleaning necessary between successive lifts in mass concrete work.
(f) To increase the resistance of concrete mixes to overvibration when being placed in constricted formwork and reinforcing.
(g) To improve concrete or mortar for grouting and filling confined spaces where aftersettlement due to bleeding must be avoided.
(h) To reduce bleeding and segregation in the manufacture of concrete pipes by the spinning process.
(i) To increase the strength of green concrete blocks or tiles which are made by pressing and/or vibrating mixes of low water/cement ratios.

Other objects and advantages achieved by this invention will become apparent from the ensuing description to those skilled in the art.

According to the invention, an improved concrete, mortar or like cement product is made from a mix to which has been added a polyelectrolyte.

The following description describes the effects of the polymeric (polyelectrolyte) admixtures on the properties of cement pastes, mortars and concretes.

MATERIALS (1) Cement: Three commercial Portland cements, the chemical analyses and surface areas of which are shown in Table 1, were used to make pastes, mortars and concretes. The cement was sieved to remove any lumps and stored in air tight tins.

*Table 1*  
ANALYSES OF CEMENTS

| Cement | $SiO_2$ | $Fe_2O_3$ | $Al_2O_3$ | CaO | MgO | $SO_3$ | Loss on ignition | Total alkalis | Surface [1] Area, cm.²/g. (Blaine) |
|---|---|---|---|---|---|---|---|---|---|
| 1 | 22.76 | 2.46 | 5.28 | 63.62 | 1.20 | 1.97 | 1.26 | 1.26 | 3,680 |
| 2 | 22.50 | 3.59 | 6.71 | 64.22 | 0.66 | 1.84 | 1.35 | 0.16 | 4,350 |
| 3 | 21.98 | 3.42 | 4.62 | 63.18 | 1.86 | 2.56 | 1.46 | 0.57 | 4,050 |

[1] $Na_2O + 0.658 K_2O$.

(2) Fine aggregates:

(a) No. 1 was a washed, rounded grain quartz sand from Leighton Buzzard, England. The particle size range was passing 18 B.S.S. mesh retained on 25 B.S.S. mesh.
(b) No. 2 was a washed quartz sand from Cardinia Creek, Victoria.
(c) No. 3 was a washed quartz sand from Frankston, Victoria.
(d) No. 4 was a blend of sands Nos. 2 and 3.

The gradings of the sands Nos. 2, 3 and 4 are shown in Table 2.

*Table 2*

| B.S.S. No. | Cumulative percent retained | | |
|---|---|---|---|
| | No. 2 | No. 3 | No. 4 |
| 7 | | 0 | |
| 14 | 1 | 0 | 1 |
| 25 | 15 | 2 | 10 |
| 52 | 58 | 18 | 39 |
| 100 | 92 | 78 | 67 |
| Pan | 99 | 100 | 92 |
| | 100 | | 100 |

(3) Coarse aggregate: Basalt screening of ¾ in. maximum size from Berwick, Victoria. The grading of this aggregate is shown in Table 3.

*Table 3*

| B.S.S. No. | Cumulative percent retained |
|---|---|
| ¾ in. | 0 |
| ½ in. | 78 |
| ⅜ in. | 98 |
| 3/16 in. | 100 |

(4) Polymeric material (polyelectrolyte):

(a) "Krilium," a product of Monsanto Chemical Company of United States of America and of Monsanto Chemicals Limited of Great Britain, is a partial calcium salt of a vinyl acetate-maleic anhydride copolymer. U.S. Patent No. 2,651,886 also in the name of Monsanto Chemical Co. refers to compounds of the "Krilium" type as partial calcium salts of the copolymer of vinyl acetate and maleic acid, while U.S. Patent No. 2,625,529 makes reference to the partial calcium salt of the partial ester of maleic anhydride-vinyl acetate copolymer. U.S. Patent No. 2,652,380 assigned to Monsanto Chemical Co. refers to the partial calcium salts of the copolymers of vinyl acetate and the partial esters of maleic acid as difficult to describe by conventional chemical nomenclature. A chemical formula is suggested in that patent but it has not been identified as the true structure especially with respect to the position of the calcium ions which may be associated at random with any of the free carboxylic acid groups. Further, Krilium is defined as a water soluble copolymer being the calcium salt of vinyl acetate and maleic acid, as can be seen from Agricultural Chemicals, vol. 8, No. 7, pages 48–50 (1953).

(b) "Polymer 212–100D," an experimental product of Monsanto Chemical Company of United States of America, is believed to be isobutylene maleic copolymer.

These polyelectrolytes dissolved slowly, consequently their solutions were prepared at least 24 hours before being added to concrete.

With the exception of the concrete strength tests which were performed in triplicate at room temperature, all experiments were done in duplicate in a constant temperature room at 20° C.

PRELIMINARY EXPERIMENTS

The relative abilities of three polyelectrolytes to increase the stiffness and cohesiveness of cement pastes were investigated by measuring the percent flows of cement pastes containing varying amounts of polyelectrolyte.

Cement pastes with water/cement ratios of 0.34 by weight were made containing varying amounts of the various polyelectrolytes. The pastes were mixed with a trowel for 1½ minutes, allowed to stand for 1 minute and remixed for 1½ minutes. The percent flows of the pastes were then measured on a standard flow table (A.S.T.M. Designation C230–52T). The results of these tests are shown in Table 4.

*Table 4*

EFFECT OF POLYELECTROLYTES ON PERCENT FLOWS OF CEMENT PASTES AT 20° C.*

| Concentration of polyelectrolyte percent by wt. of cement | Percent flow | |
|---|---|---|
| | 1 | 2 |
| 0 | >150 | >150 |
| 0.025 | 110 | |
| 0.05 | 90 | 80 |
| 0.10 | 40 | 40 |
| 0.15 | 10 | |
| 0.20 | 0 | 5 |
| 0.30 | 0 | |
| 0.40 | 0 | |

Agents:
1 = "Krilium" copolymer.
2 = "Polymer 212–100D."
* W/C=0.34 by wt., cement No. 1.

Table 4 shows that "Krilium" was the most effective agent tested for increasing the stiffness and cohesiveness of cement pastes, and since it was available commercially, it was used throughout the rest of the work referred to herein.

To demonstrate that "Krilium" does increase the degree of flocculation of the solid particles in cement pastes, a measurement of sedimentation volumes of cement suspensions containing varying amounts of polyelectrolyte was carried out. The cement used for this purpose had the following composition:

| $SiO_2$ | $Fe_2O_3$ | $Al_2O_3$ | CaO | MgO | $SO_3$ | Total Alkalis | Surface Area, cm.$^2$/g. (Wagner) |
|---|---|---|---|---|---|---|---|
| 21.86 | 2.38 | 5.00 | 63.84 | 1.18 | 1.99 | 1.09 | 1.580 |

In this test 2 g. samples of cement were weighed into 10 ml. stoppered measuring cylinders, a few ml. of water were added and the cylinders shaken. Then varying amounts of the particular polyelectrolyte solution being studied were added. Finally the cylinders were filled with water, inverted several times, and allowed to stand for 1½ hours, when the sedimentation volumes were measured. The results of these tests are summarized in Table 4A.

*Table 4A*

EFFECT OF POLYELECTROLYTES ON SEDIMENTATION VOLUMES OF CEMENT SUSPENSIONS AT 20° C.

| Concentration of Polyelectrolyte Percent by wt. of cement | "Krilium," Sedimentation Volume (ml.) |
|---|---|
| 0 | 2.60 |
| 0.01 | 3.00 |
| 0.025 | 3.10 |
| 0.05 | 3.20 |
| 0.10 | 3.25 |
| 0.15 | 3.20 |

These results clearly indicate that the polyelectrolyte brings about an increase in the degree of flocculation as it is well known that an increase in sedimentation volume of a slurry is an indication that the degree of flocculation of the solid particles has increased.

The effects of "Krilium" on percent flows of pastes made with three Portland cements from different plants were investigated. The analyses of the cements are shown in Table 1. The water/cement ratios were adjusted so that control pastes made with different cements gave equal percent flows. The percent flows of the three series of pastes containing varying concentrations of "Krilium" were measured on the standard flow table. The results in Table 5 show that "Krilium" reduced the percent flows of pastes made with cements Nos. 1 and 3 in a very similar manner. The percent flow reductions produced by "Krilium" in pastes made with cement No. 2, which has a very low alkali content, were less than the reductions in pastes made with the high alkali cements Nos. 1 and 3. A series of pastes were then made with cement No. 2 the alkali content of which was increased to 1.0% by addition of sodium hydroxide. Table 5 shows that "Krilium" reduced the percent flows in this series of pastes in a similar manner to that in pastes made with cements Nos. 1 and 3. These results indicate that a certain alkali content of the cement is necessary for "Krilium" to increase the stiffness and cohesiveness of cement pastes in the most efficient manner.

Table 5
EFFECT OF "KRILIUM" ON PERCENT FLOWS OF PASTES MADE WITH DIFFERENT CEMENTS [1]

| Concentration of "Krilium" percent by wt. of cement | Cement | | | |
|---|---|---|---|---|
| | 1 | 2 | 4 [2] | 3 |
| 0 | >150 | >150 | >150 | >150 |
| 0.05 | 90 | 100 | 70 | 65 |
| 0.10 | 40 | 70 | 40 | 40 |
| 0.15 | 10 | 55 | | 10 |
| 0.20 | | 50 | 10 | 10 |
| 0.30 | | 40 | 5 | |
| 0.40 | | 25 | 0 | |

[1] Water/cement rates was different for each series of cement pastes. Pastes were made up with an appropriate water/cement ratio so that the control pastes had equal flow properties.
Pastes made from cement No. 1 had water/cement ratio= 0.34 by wt.
Pastes made from cement No. 2 had water/cement ratio= 0.37 by wt.
Pastes made from cement No. 3 had water/cement ratio= 0.36 by wt.
Pastes made from cement No. 4 had water/cement ratio= 0.37 by wt.
[2] Cement No. 2 with added NaOH to make its total alkali content up to 1.0%.

Sand-water mixes were made from sand No. 3 with water/sand ratios of 0.25 by weight. The percent flows of various sand-water mixes containing varying concentrations of "Krilium" in the presence of lime were measured on the standard flow table. These results which are shown in Table 6, showed that "Krilium" in the presence of lime increased the stiffness and cohesiveness of sand-water mixes.

Table 6
EFFECT OF "KRILIUM" IN THE PRESENCE OF LIME ON PERCENT FLOWS OF SAND-WATER MIXES AT 20° C.[1]

| Addition | Concentration of addition percent by wt. of sand | percent flow |
|---|---|---|
| None | 0 | 40 |
| Lime | 0.2 | 30 |
| "Krilium" + Lime | 0.05+0.2 | 10 |
| "Krilium" + Lime | 0.10+0.2 | 5 |

[1] Sand No. 3, water/sand ratio=0.25 by wt.

EFFECTS OF "KRILIUM" ON THE PROPERTIES OF CEMENT PASTES AND MORTARS (a) *Effect on bleeding rates and capacities of cement pastes.*—The bleeding rates and capacities of a series of cement pastes containing varying concentrations of "Krilium" were measured by the method described by Steinour ("Further Studies of the Bleeding of Portland Cement Paste," Bulletin 4, Research Laboratory of the Portland Cement Association, Chicago, December 1945). These measurements were carried out on pastes made with cement No. 1 whose water/cement ratios ranged from 0.50 to 0.80 by weight. The results of these tests are summarized in Table 7. They show that "Krilium" additions increase the bleeding rate and markedly reduce the bleeding capacities of cement pastes. In pastes of high water/cement ratio, "Krilium" additions prevent the formation of bleeding channels.

Table 7
EFFECT OF "KRILIUM" ON BLEEDING RATES AND BLEEDING CAPACITIES OF CEMENT PASTES AT 20° C.

| Concentration of "Krilium" percent by wt. of cement | Bleeding rate × 10⁶ cm./sec. | Bleeding [1] capacity |
|---|---|---|

WATER/CEMENT RATIO=0.50 BY WT.

| 0 | 130 | 0.080 |
| 0.05 | 135 | 0.055 |
| 0.10 | 145 | 0.040 |
| 0.15 | 180 | 0.035 |

WATER/CEMENT RATIO=0.60 BY WT.

| 0 | 240 | 0.160 |
| 0.05 | 265 | 0.116 |
| 0.10 | 290 | 0.080 |
| 0.15 | 310 | 0.070 |

WATER/CEMENT RATIO=0.70 BY WT.

| 0 | [2] 380 | [2] 0.233 |
| 0.05 | 410 | 0.167 |
| 0.10 | 440 | 0.132 |
| 0.15 | 430 | 0.100 |

WATER/CEMENT RATIO=0.80 BY WT.

| 0 | [2] 460 | [2] 0.240 |
| 0.05 | 530 | 0.200 |
| 0.10 | 580 | 0.157 |
| 0.15 | 650 | 0.139 |

[1] Bleeding capacity is the total settlement per unit of original paste height.
[2] Denotes channelled bleeding occurred.

(b) *Effect on mortar consistency.*—The consistencies (percent flows) of a series of mortars containing varying amounts of "Krilium" were measured by the standard flow table test. Mortars were made with varying cement/aggregate ratios and water/cement ratios. The mortars were mixed with a trowel for 1½ minutes, allowed to stand for 1 minute and mixed again for 1½ minutes before testing to ensure that the percent flow measurements were not complicated by premature stiffening. The results which are shown in Table 8, indicate that in all cases "Krilium" additions decreased the percent flows of mortars. It was observed also that the cohesiveness of the mortars was improved by "Krilium" additions.

Table 8
EFFECT OF "KRILIUM" ON PERCENT FLOWS OF VARIOUS MORTARS AT 20° C.[1]

| Concentration of "Krilium" percent by wt. of cement | Percent flow | | |
|---|---|---|---|
| | CEMENT/AGGREGATE=⅓ | | |
| | Water/cement ratio=0.50 | Water/cement ratio=0.60 | Water/cement ratio=0.70 |
| 0 | 30 | 70 | 105 |
| 0.05 | 10 | 50 | 85 |
| 0.10 | 5 | 15 | 45 |
| | CEMENT/AGGREGATE=¼ | | |
| | Water/cement ratio=0.60 | Water/cement ratio=0.70 | Water/cement ratio=0.80 |
| 0 | 20 | 45 | 75 |
| 0.05 | 10 | 30 | 40 |
| 0.10 | 10 | 15 | 25 |
| | CEMENT/AGGREGATE=⅙ | | |
| | Water/cement ratio=0.60 | Water/cement ratio=0.70 | Water/cement ratio=0.80 |
| 0 | | | 25 |
| 0.05 | | | 15 |
| 0.10 | | | 10 |

[1] Cement/aggregate and water/cement ratios are by wt.

(c) *Effect on green strength of mortar.*—Cement mortars of low water/cement ratios and cement/aggregate ratios of ½ were mixed by hand and were pressed into bars whose dimensions were ½ in. by ½ in. by 4 in. These bars were pressed by the standard method described by Alexander ("Pozzolanas I.—A Procedure for the Reproducible Determination of Pozzolanic Reactivity," Aust. J. of Applied Science, vol. 4, No. 1, pages 146–157, 1953). Bars were made in sets of six and each set contained different amounts of "Krilium." The bars were broken in a compressive strength machine immediately after moulding to assess the effect of "Krilium" on the green compressive strength of mortars. These results are shown in Table 9 and show that "Krilium" additions significantly increase green strength of mortars.

Table 9

EFFECT OF "KRILIUM" ON COMPRESSIVE STRENGTH OF GREEN CEMENT MORTARS [1]

| Concentration of "Krilium" percent by wt. of cement | Compressive strength, p.s.i. |
| --- | --- |
| 0 | 73 |
| 0.05 | 80 |
| 0.10 | 93 |
| 0.15 | 93 |

[1] Water/cement ratio = 0.20 by wt.
Cement/aggregate = ½.
Sand = quartz sand passing 18 B.S.S. sieve retained on 100 B.S.S. sieve.

It was also noted that the bars containing "Krilium" could be handled with much less damage to the edges and corners than in the case of the control bars.

(d) *Effect on air content of pastes and mortars.*—"Krilium" did not entrain any appreciable quantities of air in pastes or mortars. A few large bubbles were formed. When mortars containing "Krilium" were trowelled, bubbles formed on the trowelled surface but these were unstable and collapsed immediately.

(e) *Effect on drying shrinkage of cement paste.*—Three series of cement pastes with different water/cement ratios were mixed by hand. Each series contained varying concentrations of "Krilium." Three bars were made from each cement paste. The bars had the dimensions 6 in. x 1 in. x 1 in. and each end had an embedded stainless steel gauge point. The bars were cured in a moist cabinet at 70° F. for 24 hours when they were demoulded and their lengths were measured on a comparator capable of measuring to 0.0001 in. The bars were placed in racks in a constant temperature room at 20° C., and allowed to dry. All the bars were made on the same day so that they all received the same drying treatment. The lengths of the bars were measured again after 28 days. Table 10 shows that "Krilium" additions had no appreciable effect on the drying shrinkage of cement paste bars.

Table 10

PERCENT DRYING SHRINKAGE OF PORTLAND CEMENT PASTE BARS [1] CONTAINING VARIOUS CONCENTRATIONS OF "KRILIUM"

| Concentration of "Krilium" percent by wt. of cement | Percent shrinkage at 28 days | | |
| --- | --- | --- | --- |
| | Water/cement ratio = 0.35 | Water/cement ratio = 0.40 | Water/cement ratio = 0.45 |
| 0 | 0.37 | 0.40 | 0.40 |
| 0.05 | 0.39 | 0.38 | 0.36 |
| 0.10 | 0.39 | 0.39 | 0.38 |

[1] Bars were made with cement No. 1 and allowed to dry at 20° C.

EFFECTS OF "KRILIUM" ADDITIONS ON CONCRETE PROPERTIES

The effects of varying amounts of "Krilium" on concrete properties were studied in four series of concretes the mix proportions of which are shown in Table 11.

Table 11

MIX PROPORTIONS OF CONCRETE

| Mix No. | Sand No. | Water/cement ratio by wt. | Cement:Sand:Coarse Aggregate by wt. |
| --- | --- | --- | --- |
| 1 | 2 | 0.66 | 1:2.33:4.24 |
| 2 | 4 | 0.63 | 1:2.33:4.24 |
| 3 | 2 | 0.79 | 1:3.44:6.25 |
| 4 | 4 | 0.79 | 1:3.44:6.25 |

(a) *Effect on slump and compressive strength of concrete.*—The concretes were mixed in a 2 cu. ft. tilting drum mixer. The cement and fine aggregate were added to the mixer and mixed dry, then water containing the appropriate amount of "Krilium" was added, and finally the coarse aggregate was added. All aggregates were dried in air before use. The mixing time was 3 minutes. After mixing, the concretes were dumped on to a steel plate and mixed with a shovel to ensure that the mix was uniform. The slumps were measured according to A.S.T.M. Designation C143–39. After the slump measurements the concrete frustums were tapped with a tamping rod to assess the cohesiveness of the concretes.

Three compressive strength test specimens from each mix were moulded in standard 6 in. x 12 in. cylindrical steel moulds. The specimens were compacted by rodding according to A.S.T.M. Designation C192–49. The specimens were removed from their moulds after 24 hours and cured in saturated lime water. The temperature of the curing water rose from 16° to 20° C. during the period while this work was being carried out. However the specimens within a particular concrete series were placed in the curing tank within a few days of each other and consequently received approximately the same curing conditions. The compressive strength specimens were capped at both ends with plaster before being broken.

The effects of "Krilium" on the slumps of the four series of concretes are shown in Table 12. "Krilium" reduced the slumps of the cement-rich mixes Nos. 1 and 2, and also increased the cohesiveness of these mixes. Although "Krilium" did not affect the slump of the harsh concretes Nos. 2 and 4 it increased their cohesiveness.

Table 12

EFFECT OF "KRILIUM" ON SLUMP OF CONCRETE

| Concentration of "Krilium," percent by wt. of cement. | Slump (in.) | | | |
| --- | --- | --- | --- | --- |
| | Mix No. 1 | Mix No. 2 | Mix No. 3 | Mix No. 4 |
| 0 | 5 | 3.5 | 0 | 0 |
| 0.025 | 2.5 | | 0 | 0 |
| 0.05 | 1.5 | 2.5 | 0 | 0 |
| 0.10 | 0.25 | 1.0 | 0 | 0 |

Difficulty was experienced in obtaining efficient mixing of some of the concretes containing "Krilium" in the tilting drum mixer. These concretes, because of their high degree of cohesiveness, tended to form large lumps of poorly mixed material. It was noticed that the effect of "Krilium" in fresh concrete occurred rapidly and it was possible to mix the concretes without "Krilium" until they were mixed properly and add the "Krilium" during the last 30 sec. of the mixing period.

Table 13 summarizes the effects of varying amounts of "Krilium" on the compressive strengths of the four series of concretes.

Table 13

EFFECT OF "KRILIUM" ON COMPRESSIVE STRENGTH OF CONCRETE

| Concentration of "Krilium," percent by wt. of cement | Compressive strength, p.s.i. | | | | |
|---|---|---|---|---|---|
| | Mix No. 1 at 28 days | Mix No. 2 | | Mix No. 3 at 28 days | Mix No. 4 at 28 days |
| | | at 28 days | at 3 months | | |
| 0 | 2,350 | 2,650 | 4,200 | 1,600 | 2,300 |
| 0.025 | 2,550 | | | 1,800 | 2,100 |
| 0.05 | 2,500 | 2,500 | 4,350 | 1,400 | 2,000 |
| 0.10 | 2,850 | 3,050 | 4,000 | 1,300 | 2,000 |

The results show that "Krilium" additions tended to increase compressive strength in the cement-rich concretes Nos. 1 and 2, and to decrease compressive strength in the No. 4 series of lean concretes. The effect of "Krilium" additions on the compressive strengths of the No. 3 series of concretes was variable. At a concentration of 0.025 percent by weight of cement "Krilium" increased the strength by 12 percent, while at a concentration of 0.10 percent by weight of cement "Krilium" decreased strength by 20 percent. An examination of the broken compressive strength specimens of this concrete series indicated that they were not properly compacted by the rodding technique. This could account for the variations in effect of "Krilium" on compressive strength in the No. 3 concrete series. Consequently the effects of "Krilium" on compressive strength were redetermined in this concrete series using a vibration table to compact the specimens. These results are given in Table 14. They show that "Krilium" additions reduce compressive strength in this concrete series to the extent of 12 percent at a concentration of 0.10 percent by weight of cement. Thus, providing concretes are properly compacted, "Krilium" can be used in concrete without seriously decreasing strength.

Table 14

EFFECT OF "KRILIUM" ON THE COMPRESSIVE STRENGTH OF CONCRETE NO. 3 WHEN COMPACTED BY VIBRATION

| Concentration of "Krilium," percent by wt. of cement | Compressive strength, p.s.i. at 28 days |
|---|---|
| 0 | 1,800 |
| 0.025 | 1,700 |
| 0.05 | 1,650 |
| 0.10 | 1,600 |

(b) *Effect on bleeding and segregation of concrete.*—The effects of varying amounts of "Krilium" on bleeding and segregation were studied in the four series of concrete mixes described in Table 11. Samples of the freshly mixed concretes were rodded into standard 6 in. x 12 in. cylindrical steel moulds. Two moulds were filled from each mix, one was allowed to stand for 2 hours and the other was vibrated on a vibrating table for 2 minutes and allowed to stand for 2 hours. Then the amount of bleeding was estimated and the top surfaces of the specimens were examined. The vibrated specimens were allowed to harden and were cut down the long axis of the cylinder with a diamond saw to expose the aggregate. This allowed the degree of segregation to be assessed.

Both the unvibrated and vibrated control specimens of the four series of concretes, which contained no "Krilium," bled copiously and characteristic bleeding "craters" formed on their top surfaces. "Krilium" additions progressively reduced the amount of bleeding in both the unvibrated and vibrated specimens as the concentration increased. In the unvibrated specimens a concentration of "Krilium" of 0.025 percent by weight of cement reduced the amount of bleeding by approximately 10–20 percent, while a concentration of 0.10 percent by weight of cement reduced the amount of bleeding by approximately 50 percent. "Krilium" additions also reduced the amount of bleeding significantly in the vibrated specimens; however such reductions were smaller than those in the unvibrated concrete specimens. "Krilium" additions greater than 0.025 percent by weight of cement prevented the formation of bleeding "craters" in both the unvibrated and vibrated specimens of all four series of concretes.

In the vibrated specimens of the cement-rich concretes Nos. 1 and 2, "Krilium" additions at concentrations greater than 0.025 percent by weight of cement, completely prevented aggregate segregation. No aggregate segregation was discernible in the vibrated control specimens of the lean concretes Nos. 3 and 4; however a layer of neat cement paste about ¼ in. thick formed on the top surfaces of these specimens. It was found that "Krilium" additions of 0.025 percent by weight of cement or greater prevented the formation of the layer of cement paste in specimens of concretes Nos. 3 and 4.

(c) *Effect on air content of concrete.*—"Krilium" did not entrain any appreciable amounts of air in the four series of concretes studied.

It is thus apparent that the addition of the polyelectrolyte to the mix, increases the cohesiveness of cement pastes, mortars, and concretes. In addition, bleeding and segregation in concrete are reduced. These effects are obtained without entraining appreciable amounts of air or decreasing the compressive strength of concrete seriously.

These results indicate that cement pastes containing the polyelectrolyte can be made with high water/cement ratios yet such pastes will be as plastic and cohesive as normal pastes made with lower water/cement ratios. The workability of lean, harsh concretes and mortars cannot be improved by merely adding more water to the mix because although the paste volume is increased the resulting paste is fluid, non-cohesive and bleeds excessively. However, the use of the polyelectrolyte according to the invention allows the workability of lean concretes and mortars to be improved by increasing the water/cement ratio without destroying the plasticity and cohesiveness of the paste or promoting excessive bleeding of the paste.

In addition, the use of the polyelectrolyte as a concrete admixture may provide a cheap means of improving the cohesiveness of lean concretes made from locally available coarse sand deficient in fine particles, thus obviating the present necessity for transporting fine sand to the site to blend with the coarse sand.

Since polyelectrolyte additions increase the resistance of concrete to segregation and bleeding when vibrated, concrete containing polyelectrolyte according to the invention can be vibrated for longer periods of time than normal concretes. This could be useful when concrete is to be vibrated in constricted formwork and reinforcing.

Polyelectrolyte additions prevent the formation of a layer of cement paste on the top surface of lean concrete specimens that have been vibrated. Consequently, the addition of a polyelectrolyte could be useful in mass concrete construction work by reducing the amount of surface cleaning necessary between successive lifts.

In under-water concreting, the increased cohesiveness of concrete according to the invention improves the ease of placing the concrete and reduces the washing away of cement by water currents.

Because of the reduced slump and segregation, concrete according to the invention can be used effectively for grouting and filling confined spaces where aftersettlement and segregation must be avoided.

Polyelectrolyte additions increase the green strength of cement mortars made with low water/cement ratios. Consequently polyelectrolyte additions could be useful in reducing the breakage due to handling of concrete blocks, tiles, or other moulded shapes which are made by pressing concretes and mortars of low water/cement ratios.

A FIELD TEST OF THE USE OF "KRILIUM" IN PNEUMATICALLY PLACED MORTAR

Mortar which is projected by an air jet directly on to the surface to which it is to be applied is known as pneumatically placed mortar, "Shotcrete," or "Gunite." One of the problems encountered in pneumatically placing mortar is rebound. Rebound is a mixture of sand and cement which bounces back from the surface where the mortar is being applied because of collision with new hard surface, reinforcement, or with sand particles themselves. The rebound is troublesome to clean up from a job and is a waste of sand and cement. It was considered that "Krilium" because of its ability to increase cohesiveness of mortars, could be added to mortar for pneumatic placing to decrease the amount of rebound.

A field test on the use of "Krilium" in mortar placed by the "Gunite" process was accordingly carried out. A river diversion channel was being lined with 2½ in. thick slabs of mortar placed by the "Gunite" process. The mortar had a cement/sand ratio of 1/5 and a water/cement ratio of approximately 0.45 by wt. The grading of the sand used in the test conformed to the grading recommended by the American Concrete Institute Standard, "Recommended Practice for the Application of Mortar by Pneumatic Pressure" (ACI 805-51). (Journal of the American Concrete Institute, v. 22, No. 9, May 1951.) However, microscopical examination of this sand showed that the fine fractions of this sand were composed of angular and elongated particles. This probably was the reason why mortars made with this sand produced an excessive amount of rebound when placed pneumatically.

The following tests were performed:

(1) A control panel of mortar approximately 8 ft. x 9 ft. and 2½ in. thick, containing no "Krilium" was placed pneumatically. The amount of rebound was high and was estimated to be about 10-15% of the total mortar volume.

(2) A panel of mortar containing approximately 0.05 percent of "Krilium" by wt. of cement was placed pneumatically. The dimensions of the panel and the water/cement ratio were the same as in Test 1. The amount of rebound was about the same as in Test 1.

(3) A control panel of mortar containing no "Krilium" but with a water/cement ratio of approximately 0.60 by wt. was placed pneumatically. The amount of rebound was lower than in Tests 1 and 2; however the panel was so wet that it tended to slump down the sloping channel side into the channel bottom.

(4) A panel of mortar containing 0.05 percent of "Krilium" by wt. of cement and having a water/cement ratio of approximately 0.60 by wt. was placed pneumatically. The rebound was practically eliminated and the panel showed no signs of slumping down the channel side. It should be noted that all these test panels were on the side of the channel and were inclined at an angle of about 45° to the vertical.

The panels were sprayed with curing compound. They were inspected after three months and all four panels were found to be free from any visible cracks.

These tests indicate that the amount of rebound in pneumatically placed mortars can be reduced by increasing the water/cement ratio in the presence of "Krilium." Since the compressive strength of mortars varies inversely with water/cement ratio, the use of "Krilium" as described above should be applied only in cases where compressive strength is not of prime importance.

A PLANT TEST OF THE USE OF "KRILIUM" IN THE MANUFACTURE OF CONCRETE PIPES

A plant test of the use of "Krilium" in the manufacture of concrete pipes was also carried out. The concrete pipes are made by a spinning process which consists of placing a cement rich concrete mix with a low water/cement ratio in a cylindrical steel form which contains reinforcing mesh. The cylindrical form is rotated at high speed to compact the concrete and centrifuge excess water out of the concrete. The pipe is cured in steam for 24 hours when the form is stripped from the concrete pipe.

Some of the disadvantages of the spinning process are:

(1) It is necessary to spin the pipes for 15-20 minutes in order to compact the concrete properly so that pipes are produced which are self-supporting in the form and which are impervious to water under pressure after the concrete has set.

(2) Some of the low water/cement ratio concrete mixes used do not flow round the reinforcing mesh properly and this often produces pipes which leak. If the water/cement ratios of such mixes are increased then the mix will flow round the reinforcement satisfactorily, but excessive bleeding and aggregate segregation occurs and an unstable layer of cement paste forms on the inner surfaces of the pipes.

In the plant test, six pipes each with a diameter of 3 ft., a length of 10 ft. and a thickness of 2½ in., were made by the spinning process. Three of the pipes were made from concrete containing no "Krilium" additions, and three were made from concrete containing 0.05 percent of "Krilium" by wt. of cement. The concretes used had the mix proportions of 1 of cement:1 of sand:1½ of coarse aggregate by volume. The control pipes were made from concrete with an initial water/cement ratio of approximately 0.57-0.60 by wt. The three pipes containing "Krilium" were made with concrete at three different initial water/cement ratios, which were approximately 0.50, 0.60 and 0.70 by wt.

The tests showed that:

(1) "Krilium" additions allowed the spinning time to produce adequate compaction of the pipes, to be reduced from 15-20 minutes to 5-10 minutes. This could mean an increase in the rate of production of concrete pipes by the spinning process.

(2) "Krilium" additions allowed concrete with an increase water/cement ratio to be used in pipe manufacture. This improved the ease with which the concrete flowed round the reinforcement. It was observed that in the presence of "Krilium," the increased water/cement ratio did not increase aggregate segregation, nor did it cause an unstable layer of cement paste to form on the interior surfaces of the pipes.

(3) Tests on the six pipes after 28 days showed that compressive strength and impermeability to water under pressure of the pipes made with concrete containing "Krilium" were as good as that of the control pipes made from concrete containing no "Krilium."

A FIELD TEST OF THE USE OF "KRILIUM" IN READY MIXED CONCRETE WHICH IS USED BY BUILDING CONTRACTORS

Most of the concrete produced by the "Ready Mixed" concrete industry is consumed on small building projects such as paths, slabs, foundations, floors etc. This type of concrete usually has mix proportions of 1 of cement:2 of sand:4 of coarse aggregate by volume and a water/cement ratio which ranges from 0.60 to 0.80 by wt. Most ready mixed concrete is slowly agitated in truck mixers for periods of up to 1 hour before being placed. During this transporting period the concrete loses a lot of its fluidity due to reaction of water and cement, and consequently is difficult to discharge from the truck mixer and place on the job. This effect is very significant in hot weather. Thus high water/cement ratios are used to ensure that the concrete can be discharged from the truck mixer and placed easily on arrival at the concrete job site. In cold weather and after short transporting periods, ready mixed concrete is often very wet and fluid which leads to excessive bleeding and aggregate segregation when it is placed. The excessive bleeding extends the period that workers must wait before trowelling and finishing concrete surfaces.

A field test to study the effects of "Krilium" additions on the handling, placing and trowelling properties of ready mixed concrete was carried out. The concrete used in this test was made from weigh-batched materials, and had the mix proportions of cement:sand:coarse aggregate of 1:2.72:4.14 by wt. The water/cement ratio was 0.72 by wt. The gradings of the sand and coarse aggregate are given in Tables 15 and 16. The test took place on a fine day when the maximum temperature was about 65° F. In the morning a 3 cubic yard control batch of concrete containing no "Krilium" was transported 8 miles in 35 minutes by a truck mixer. It was then discharged at a job where the concrete was laid in a footpath. In the afternoon a 3 cubic yard batch of concrete containing "Krilium" in a concentration of 0.05 percent by wt. of cement, was transported to the same job in the same truck mixer and the concrete was laid in a footpath. The mix proportions and water/cement ratios were the same in both concrete batches.

*Table 15*

GRADING OF COARSE AGGREGATE USED IN THE READY MIXED CONCRETE TEST

| B.S.S. No. | Cumulative percent retained |
|---|---|
| 1½ in | 0 |
| ¾ in | 16.8 |
| ⅜ in | 90.8 |
| No. 4 | 98.3 |
| No. 7 | 100.0 |

*Table 16*

GRADING OF SAND USED IN THE READY MIXED CONCRETE TEST

| B.S.S. No. | Cumulative percent retained |
|---|---|
| 4 | 0 |
| 7 | 7.0 |
| 14 | 20.3 |
| 25 | 54.7 |
| 52 | 83.8 |
| 100 | 97.5 |
| Pan | 100.0 |

The following observations were made during the test:

(1) The slump of the control concrete delivered on the job was 4½ in. and the slump of the "Krilium" concrete was 2½ in.

(2) The control concrete batch discharged from the truck mixer in a non-uniform manner. The first part of the batch was rich in mortar and the last part of the batch was deficient in mortar and had a "boney" appearance. The "Krilium" concrete discharged from the truck mixer in a very uniform state.

(3) The "Krilium" concrete exhibited very much less bleeding than the control concrete.

(4) The "Krilium" concrete was more cohesive or "fatty" than the control concrete. Because of this it was found that the "Krilium" concrete could be worked and screeded more easily than the control concrete which tended to be of harsh consistency.

(5) It was impossible to begin trowelling and finishing operations on the path made with the control concrete until 1–1½ hr. after the screeding operation had finished. This was due to the excessive amount of bleeding. However the path made with the "Krilium" concrete was able to be troweled satisfactorily about ½ hr. after finishing the screeding operation.

(6) The paths were inspected after 3 months and both the control and "Krilium" concretes were found to be in good condition and free of surface cracks.

I claim:

1. A cementitious mix containing Portland cement and from 0.025 up to 0.1 weight percent based on the weight of the cement in the mix of a water-soluble additive comprising a partial calcium salt of a vinyl acetate-maleic anhydride copolymer.

2. A cementitious product made from a cementitious mix containing Portland cement and from 0.025 up to 0.1 weight percent based on the weight of the cement in the mix of a water-soluble additive comprising a partial calcium salt of a vinyl acetate-maleic anhydride copolymer.

3. In a method of making a cementitious product, the step of adding to the cementitious mix from which the product is made, from 0.025 up to 0.1 weight percent based on the weight of the cement in the mix of a water-soluble additive comprising a partial calcium salt of a vinyl acetate-maleic anhydride copolymer.

References Cited in the file of this patent

UNITED STATES PATENTS

| 2,576,955 | Ludwig | Dec. 4, 1951 |
| 2,614,998 | Lea | Oct. 21, 1952 |
| 2,759,902 | Claudi-Magnussen | Aug. 21, 1956 |

FOREIGN PATENTS

| 666,865 | Great Britain | Feb. 20, 1952 |